Patented Apr. 20, 1937

2,077,446

UNITED STATES PATENT OFFICE 2,077,446

PROCESS OF MATURING AND RIPENING BEERS AND ALES

Leo Wallerstein, New York, N. Y.

No Drawing. Application May 2, 1933, Serial No. 668,987

7 Claims. (Cl. 99—48)

The present invention relates to the maturing and ripening of malt beverages, such as beer and ale, and it particularly relates to the utilization of certain preparations for the purpose of shortening the period required in the maturing and ripening of the beverages.

The invention particularly resides in the discovery that certain enzymes of plant origin, which are subject to enhancement, may be added to a malt beverage in enhanced condition to accelerate the maturing and ripening process thereof.

Beer is produced from malt, usually barley malt, hops, water and yeast with or without the addition of other cereals. In the brewing process the malt is cleaned and crushed and then mashed with or without other cereals. The resultant solution containing the extractives is strained or filtered from the grains or insoluble portions of the mash.

This solution, termed the wort, is boiled with the addition of hops. Then the hopped wort is strained or filtered from the spent hops, the wort is cooled, and yeast is added to incite fermentation. The malt beverage after fermentation is drawn off and is stored for a considerable length of time in order that it may ripen and mature.

Such ripening and maturing is usually brought about by storing the beverages in large vats, known as storage vats, at low temperatures around 32 to 40° F. This time of aging varies, but for well-matured beverages, such as lager beers, it frequently requires from one to three months. During the storing and aging a number of changes take place. For instance the clarification, which results, may be readily followed by visual observation. Other changes cause improvement in the flavor, taste and general qualities. These changes are much more subtle and take place very slowly and gradually.

Up to the present time the mechanism of these changes has not been fully explained. The first mentioned changes, that is, the clarification of the beverage, may be assisted by the addition of finings, such as gelatin, to the beverage or by filtration. The ripening and maturing, however, resulting in general improvement in flavor and taste, is not readily subject to acceleration.

This long continued ripening and maturing of malt beverages require the utilization of a large amount of storage facilities, and considerably ties up the capital of the brewing establishment.

Moreover, when the beer is to be bottled and then pasteurized, it has been found that the maturing and ripening must be accomplished before the pasteurization operation. The pasteurization operation apparently has the effect of stopping or preventing continuation of the normal maturing and ripening of beer, so that even though the beer be stored or kept in bottles for considerable periods of time after it has been pasteurized, no substantially maturing or ripening takes place.

An object of the present invention is to provide a product and process by which it will be possible to substantially accelerate the maturing and ripening of malt beverage, with resultant economy in the cost of manufacture and with improvement in the quality of the malt beverage produced.

Another object is to provide a process and product by which it will be possible to accomplish the maturing and ripening of beer even after it has been bottled and subsequently pasteurized.

It has been found that by the use of certain proteolytic enzymatic preparations, when in enhanced condition, it is possible to accelerate and hasten the maturing and ripening of malt beverages, and, if desired, accomplish such maturing and ripening, even after pasteurization.

Well-suited for this purpose are enhanced proteolytic enzymatic preparations of plant origin, such as papain, bromelin or enzyme preparations derived from germinating seeds, which are active in slightly acid, neutral or in slightly alkaline environments.

The preferred enhancing materials are bacterial metabolic products particularly those derived by the cultivation of aerobic, spore-forming, non-pathogenic bacteria, particularly of the type known as B. subtilis and B. mesentericus.

Only comparatively small amounts of the enhanced enzyme materials are necessary to accomplish the desired acceleration of the ripening and maturing of the malt beverage. For example, the addition of from 1 to 10 grams per 31 gallon barrel or per 117 liters of malt beverage has been found to give excellent results and greatly to hasten the maturing and ripening of the beverage. The addition of the preparation either in the liquid form or in the active dry form may be made shortly prior to, during fermentation, or shortly after the main fermentation has been finished.

It has also been found that the addition of these products as described also brings about quicker clarification and according to tests beers, ales, or other malt beverages so treated will mature in a shorter time than similar beers or ales to which these preparations have not been added.

For example, as compared to the period of one to three months previously required for the ripening and maturing of malt beverages by the utilization of the preparations of the present invention, it is possible to shorten the period of storage to as short a time as a week or ten days with the production of a beverage, beer or ale of the same or superior quality.

It has been found that the best results are obtained when the above described preparations are added to the beer shortly before the fermentation is completed and when the beer still contains considerable amount of yeast.

It has been observed that upon the addition to beer when it still contains this yeast, the described action of the ripening and maturing of the beer is considerably accelerated.

While the mechanism of the action of these preparations, as stated before, has not been established, it is probable that they have the power to act on the yeast cells and due to this action certain constituents contained in the yeast cells will diffuse from the yeast cells into the beer and thereby speed up the aging and maturing of the beer.

The addition of the enzymatic preparations, as described above, to the beer, ale, or other malt beverage, has been found to cause continued ripening and maturing even though the beer be pasteurized and thereafter stored, as for example, in bottles. By adding preparations to beer, which is to be pasteurized, it is not necessary to store the beer or other malt beverage for long periods of time before pasteurization to achieve the desired maturity and ripening. Moreover, although beer, ale and other malt beverages frequently decrease in quality upon pasteurization, with the addition of the preparations, according to the present invention, such disadvantageous effect of pasteurization appears to be altogether avoided.

The metabolic enzymatic preparation may be prepared in the manner described in my copending application Serial No. 668,986, filed May 2, 1933, now Patent No. 2,011,095, dated August 13, 1935.

These bacterial preparations containing products resulting from the metabolism of the bacteria function most advantageously in causing ripening and maturing of beer, and appear to enhance the action of the papain or other plant enzyme when combined therewith before addition to the malt beverage to be matured and ripened.

By the word "plant" is also excluded enzymes such as are derived from fungi, molds, or animals.

The present application is similar in subject matter to the applications Ser. Nos. 668,986, filed May 2, 1933, now Patent No. 2,011,095, and 672,039, filed May 20, 1933, now Patent No. 2,011,096, which relate to processes of treating, stabilizing, maturing and/or ripening beers and ales by the additions of metabolic products derived from certain types of bacilli and molds. Enhanced enzyme mixtures containing pepsin and papain with or without one or more of said metabolic products other than those claimed specifically in the present application, are more fully covered in the copending applications Ser. Nos. 759,738, filed Dec. 29, 1934; 82,924, filed June 1, 1936; and 82,925, filed June 1, 1936, all of which are being issued upon even date herewith.

I claim:

1. The process of maturing and ripening alcoholic fermented malt beverages which comprises adding to the beverage before it has matured and ripened papain and the metabolic material produced upon the cultivation of bacillus selected from the group consisting of *Bacillus subtilis* and *Bacillus mesentericus* and then causing it to mature and ripen, the process of maturing and ripening being accelerated by said addition.

2. The process of maturing and ripening alcoholic fermented malt beverages which comprises adding to the beverage before it has matured and ripened a mixture of a papain preparation and the precipitate formed by salting out the metabolic material produced upon the cultivation of bacillus selected from the group consisting of *Bacillus subtilis* and *Bacillus mesentericus* and then causing it to mature and ripen.

3. The process of maturing and ripening alcoholic fermented malt beverages which comprises adding to the beverage before it has matured and ripened a mixture of a papain preparation and the precipitate formed by adding alcohol to the metabolic material produced upon the cultivation of bacillus selected from the group consisting of *Bacillus subtilis* and *Bacillus mesentericus* and then causing it to mature and ripen.

4. In the process of making a beverage which includes alcoholic fermentation of a boiled and cooled malt wort, adding a mixture containing a papain preparation and metabolic material produced by cultivation of bacillus selected from the group consisting of *Bacillus subtilis* and *Bacillus mesentericus*, said metabolic material containing that portion thereof which is precipitable by salting out and by alcohol, said addition to the material being effected before it has matured and ripened, and then causing ripening and maturing of the material after the alcoholic fermentation.

5. In the process of making a beverage which includes alcoholic fermentation of a boiled and cooled malt wort, adding a papain preparation, and a metabolic material produced by cultivation of bacillus selected from the group consisting of *Bacillus subtilis* and *Bacillus mesentericus*, said metabolic material containing that portion thereof which is precipitable by salting out and by alcohol, said addition to the material being effected before it has matured and ripened, and then causing ripening and maturing of the material after the alcoholic fermentation.

6. In the process of making a beverage which includes alcoholic fermentation of a boiled and cooled wort, adding a mixture containing a plant enzyme preparation selected from the group consisting of papain, bromelin, and enzyme preparations derived from germinating seeds, and metabolic material produced by cultivation of bacillus selected from the group consisting of *Bacillus subtilis* and *Bacillus mesentericus*, said metabolic material containing that portion thereof which is precipitable by salting out and by alcohol, said addition to the material being effected before it has matured and ripened, and then causing ripening and maturing of the material after the alcoholic fermentation.

7. In the process of making a beverage which includes alcoholic fermentation of a boiled and cooled malt wort, adding a plant enzyme preparation selected from the group consisting of papain, bromelin, and enzyme preparations derived from germinating seeds, and a metabolic material produced by cultivation of bacillus selected from the group consisting of *Bacillus subtilis* and *Bacillus mesentericus*, said metabolic material containing that portion thereof which is precipitable by salting out and by alcohol, said addition to the material being effected before it has matured and ripened, and then causing ripening and maturing of the material after the alcoholic fermentation.

LEO WALLERSTEIN.